(12) United States Patent
Ceko (10) Patent No.: US 8,474,221 B1
(45) Date of Patent: Jul. 2, 2013

(54) TELESCOPING FIBERGLASS UTILITY POLE

(75) Inventor: Peter Ceko, Barrington Hills, IL (US)

(73) Assignee: Trident Industries, LLC, Chicago, IL (US)

( * ) Notice: Subject to any disclaimer, the term of this patent is extended or adjusted under 35 U.S.C. 154(b) by 0 days.

(21) Appl. No.: 13/494,539

(22) Filed: Jun. 12, 2012

Related U.S. Application Data (60) Provisional application No. 61/589,285, filed on Jan. 20, 2012.

(51) Int. Cl.
| | | |
|---|---|---|
| *E04C 3/00* | (2006.01) | |
| *B66C 23/06* | (2006.01) | |
| *B66C 23/62* | (2006.01) | |
| *E04H 12/34* | (2006.01) | |
| *E04H 12/24* | (2006.01) | |
| *F16M 11/00* | (2006.01) | |
| *H02G 7/20* | (2006.01) | |

(52) U.S. Cl.
USPC .............. 52/843; 52/844; 52/835; 52/118; 248/157; 174/45 R (58) Field of Classification Search
USPC ............ 52/534, 835, 843, 844, 117, 118, 52/111, 244, 296, 301, 726.4, 300, 831, 848, 52/FOR. 119; 248/157, 161, 404, 406, 406.1, 248/410, 411, 159, 354.1, 354.3; 362/431, 362/403, 413; 174/45 R
See application file for complete search history.

(56) References Cited

U.S. PATENT DOCUMENTS

| | | | |
|---|---|---|---|
| 3,054,783 A | | 7/1962 | Daniels |
| 3,154,200 A | | 10/1964 | Versch |
| 3,236,398 A | | 2/1966 | Thiermann |
| 3,495,370 A | * | 2/1970 | Habro et al. .............. 52/632 |
| 3,564,804 A | * | 2/1971 | Archer et al. ............ 52/745.17 |
| 3,574,104 A | | 4/1971 | Medler |
| 3,712,005 A | | 1/1973 | Eschbach et al. |
| 3,776,650 A | | 12/1973 | Zenhausern |
| 3,813,837 A | | 6/1974 | McClain et al. |
| 3,973,756 A | | 8/1976 | Lauzier |
| 3,984,962 A | | 10/1976 | Krohn |

(Continued)

FOREIGN PATENT DOCUMENTS

| | | |
|---|---|---|
| CA | 1 250 757 A1 | 3/1989 |
| DE | 295 00 479 U1 | 1/1995 |

(Continued)

OTHER PUBLICATIONS

Pultrusion Industry Council ACMA: Products & Process: Glossary of Pultrusion Terms; Copyright © 2008; pp. 2-24 http://www.acmanet.org/pic/products/glossary.htm.

*Primary Examiner* — William Gilbert
*Assistant Examiner* — Kyle Walraed-Sullivan
(74) *Attorney, Agent, or Firm* — David R. Heckadon; Gordon & Rees, LLP (57) ABSTRACT

An environmentally friendly fiberglass utility pole that comes in three sections that are telescoped one around the other to provide a strong, wind and bending resistant structure. Each of the three sections has alternating protruding and intruding surfaces that are slip fit together to provide maximum strength while conserving material. Additionally, each of the three sections preferably are different lengths such that maximum reinforcement is provided along the center of the length of the pole, without requiring excessive material (or weight) at the top end of the pole.

23 Claims, 8 Drawing Sheets

U.S. PATENT DOCUMENTS

| | | | |
|---|---|---|---|
| 3,987,593 | A | 10/1976 | Svensson |
| 3,989,397 | A | 11/1976 | Baker |
| 4,012,267 | A | 3/1977 | Klein |
| 4,036,371 | A | 7/1977 | Michel |
| 4,055,318 | A | 10/1977 | Duckett |
| 4,065,890 | A | 1/1978 | Fenner |
| 4,073,477 | A | 2/1978 | Walters |
| 4,103,104 | A | 7/1978 | Spollen |
| 4,104,868 | A | 8/1978 | Jackson |
| 4,142,343 | A | 3/1979 | Trafton |
| 4,172,175 | A | 10/1979 | Pearson |
| 4,194,338 | A | 3/1980 | Trafton |
| 4,362,451 | A | 12/1982 | Thiermann |
| 4,438,430 | A | 3/1984 | Young et al. |
| 4,485,597 | A | 12/1984 | Worrallo |
| 4,516,069 | A | 5/1985 | Schmanski |
| 4,738,058 | A | 4/1988 | Svensson |
| 4,751,804 | A | 6/1988 | Cazaly |
| 4,803,819 | A | 2/1989 | Kelsey |
| 4,812,343 | A | 3/1989 | Kiekhaefer et al. |
| 4,941,763 | A | 7/1990 | Euteneuer |
| 5,175,971 | A | 1/1993 | McCombs |
| 5,186,437 | A | 2/1993 | Scott |
| 5,207,850 | A | 5/1993 | Parekh |
| 5,212,891 | A | 5/1993 | Schuermann et al. |
| 5,222,344 | A | 6/1993 | Johnson |
| 5,251,420 | A | 10/1993 | Johnson |
| 5,263,296 | A | 11/1993 | Spera |
| 5,354,607 | A | 10/1994 | Swift et al. |
| 5,361,855 | A | 11/1994 | Schuermann et al. |
| 5,457,288 | A | 10/1995 | Olsson |
| 5,465,929 | A | 11/1995 | Dooley |
| 5,476,627 | A | 12/1995 | Black |
| D370,273 | S | 5/1996 | Stagl |
| 5,513,477 | A | 5/1996 | Farber |
| 5,568,519 | A | 10/1996 | Baier et al. |
| 5,585,155 | A | 12/1996 | Heikkila et al. |
| 5,650,224 | A | 7/1997 | March et al. |
| 5,658,307 | A | 8/1997 | Exconde |
| 5,704,185 | A | 1/1998 | Lindsay |
| 5,716,686 | A | 2/1998 | Black |
| 5,718,669 | A | 2/1998 | Marble |
| 5,794,387 | A | 8/1998 | Crookham |
| 5,870,877 | A | 2/1999 | Turner |
| 5,890,333 | A | 4/1999 | Boroviak |
| 5,899,423 | A | 5/1999 | Albertini |
| 5,937,521 | A | 8/1999 | March et al. |
| D415,574 | S | 10/1999 | Shrira |
| 5,971,508 | A | 10/1999 | Deimen et al. |
| 5,971,509 | A | 10/1999 | Deimen et al. |
| 5,972,275 | A | 10/1999 | Phelps et al. |
| 5,975,009 | A * | 11/1999 | Nihra et al. ................. 116/173 |
| 5,979,119 | A | 11/1999 | Trafton et al. |
| 5,999,677 | A | 12/1999 | Moncisvais et al. |
| 6,007,656 | A | 12/1999 | Heikkila |
| 6,047,514 | A | 4/2000 | Versch |
| 6,087,467 | A | 7/2000 | Marrocco, III et al. |
| 6,098,353 | A * | 8/2000 | Stanfield ................. 52/170 |
| 6,106,944 | A | 8/2000 | Heikkila et al. |
| 6,155,017 | A | 12/2000 | Turner |
| D441,877 | S | 5/2001 | Fortier |
| 6,302,377 | B1 | 10/2001 | Pimentel |
| 6,357,196 | B1 | 3/2002 | McCombs |
| 6,367,215 | B1 | 4/2002 | Laing |
| 6,400,873 | B1 | 6/2002 | Gimblet et al. |
| 6,453,635 | B1 | 9/2002 | Turner |
| 6,513,234 | B2 | 2/2003 | Wilemon et al. |
| 6,568,072 | B2 | 5/2003 | Wilemon et al. |
| 6,627,704 | B2 | 9/2003 | Yeager et al. |
| 6,742,314 | B2 * | 6/2004 | Young ................. 52/835 |
| 6,764,057 | B2 | 7/2004 | Fanucci et al. |
| 6,812,276 | B2 | 11/2004 | Yeager |
| 6,834,469 | B2 | 12/2004 | Fingerson et al. |
| 6,897,382 | B2 | 5/2005 | Hager et al. |
| 6,993,802 | B1 | 2/2006 | Hone |
| 7,063,096 | B2 | 6/2006 | Stoeckler |
| 7,116,282 | B2 | 10/2006 | Trankina |
| 7,127,865 | B2 | 10/2006 | Douglas |
| 7,200,973 | B2 | 4/2007 | Tunis |
| 7,228,672 | B2 | 6/2007 | Hayes et al. |
| 7,275,296 | B2 * | 10/2007 | DiCesare ................. 29/464 |
| 7,578,245 | B2 | 8/2009 | Loines |
| 7,762,016 | B2 * | 7/2010 | Davidson ................. 40/607.01 |
| 7,832,178 | B2 * | 11/2010 | Rouse ................. 52/835 |
| 7,966,777 | B2 * | 6/2011 | Douglas et al. ................. 52/118 |
| 2001/0053820 | A1 | 12/2001 | Yeager et al. |
| 2002/0037409 | A1 | 3/2002 | Tunis |
| 2002/0073915 | A1 | 6/2002 | Howard |
| 2002/0095904 | A1 | 7/2002 | Fingerson et al. |
| 2003/0096123 | A1 | 5/2003 | Yeager |
| 2003/0205021 | A1 * | 11/2003 | Ryan ................. 52/736.1 |
| 2004/0026112 | A1 | 2/2004 | Goldsworthy et al. |
| 2004/0050579 | A1 | 3/2004 | Hager et al. |
| 2004/0050580 | A1 | 3/2004 | Hager et al. |
| 2004/0050581 | A1 | 3/2004 | Hager et al. |
| 2004/0050584 | A1 | 3/2004 | Hager et al. |
| 2004/0065457 | A1 | 4/2004 | Hager et al. |
| 2004/0121137 | A1 | 6/2004 | Tunis |
| 2004/0134162 | A1 | 7/2004 | Douglas |
| 2005/0184206 | A1 | 8/2005 | Lepley et al. |
| 2005/0223673 | A1 | 10/2005 | Cadwell et al. |
| 2006/0123725 | A1 | 6/2006 | Godwin |
| 2006/0150531 | A1 | 7/2006 | Cann |
| 2006/0150572 | A1 * | 7/2006 | Rawson-Harris ............ 52/736.2 |
| 2006/0201081 | A1 | 9/2006 | Godwin |
| 2006/0218873 | A1 * | 10/2006 | Christensen et al. ........ 52/737.1 |
| 2006/0254167 | A1 | 11/2006 | Antonic |
| 2006/0289189 | A1 | 12/2006 | Aisenbrey |
| 2007/0013096 | A1 | 1/2007 | Rekret |
| 2007/0107370 | A1 | 5/2007 | Douglas |
| 2007/0113958 | A1 | 5/2007 | Brown et al. |
| 2007/0113983 | A1 | 5/2007 | Brown et al. |
| 2007/0116941 | A1 | 5/2007 | Brown et al. |
| 2007/0117921 | A1 | 5/2007 | Brown et al. |
| 2007/0209305 | A1 | 9/2007 | Douglas |
| 2007/0223993 | A1 | 9/2007 | Peterson et al. |
| 2007/0252302 | A1 | 11/2007 | Hager et al. |
| 2007/0266670 | A1 | 11/2007 | Williams |
| 2009/0188207 | A1 * | 7/2009 | Gordin et al. ................. 52/834 |
| 2010/0064630 | A1 | 3/2010 | Williams |
| 2011/0134653 | A1 * | 6/2011 | Williams ................. 362/431 |
| 2012/0011804 | A1 * | 1/2012 | Winterhalter et al. ......... 52/834 |

FOREIGN PATENT DOCUMENTS

| | | |
|---|---|---|
| FR | 2 704 891 A1 | 5/1993 |
| GB | 928348 | 6/1963 |
| GB | 2 425 296 A | 10/2006 |
| WO | WO 89/00917 | 2/1989 |
| WO | WO 92/01850 A1 | 2/1992 |
| WO | WO 93/15292 A1 | 1/1993 |
| WO | WO 94/26501 A1 | 11/1994 |
| WO | WO 2006/050235 A1 | 5/2006 |
| WO | WO 2007/136676 A2 | 11/2007 |
| WO | WO 2009/009425 A2 | 1/2009 |

* cited by examiner

TELESCOPING FIBERGLASS UTILITY POLE

RELATED APPLICATION

The present application claims priority to U.S. Provisional Patent Application Ser. No. 61/589,285, filed Jan. 20, 2012, of the same title.

TECHNICAL FIELD

The present invention relates to environmentally friendly fiberglass utility poles.

BACKGROUND OF THE INVENTION

Most utility poles used today made of wood. Such wooden poles are pressure treated to preserve them from the weather, insects and other types of attacks and decay. Specifically, they are treated with a number of toxic chemicals including pentachlorphenol, chromated copper arsenate, creosote, copper azole and others. Pentachlorophenol (Penta) is widely-used wood preservative that is normally dissolved in a petroleum carrier. It is the most commonly used preservative system utilized by North American utilities. Chromated Copper Arsenate (CCA) is water-borne treatment that offers a wide range of advantages for treated lumber, timber and poles; clean; odorless; paintable. For poles, its use is limited to southern yellow pine, pinus sylvestris, and western red cedar. Creosote is an oil-based wood preservative blended from the distillation of coal tar and comprised of more than 200 major constituents. Used in industrial applications, such as railroad ties, piling (both salt water and fresh water), and for utility poles. Copper Azole (CA-B) is a water-borne copper based wood preservative with an organic co-biocide (Tebuconazol). Similar in color, to CCA-C, odorless, clean, paintable or stainable. Copper Azole is approved by the American Wood Preservers Association for use on Western Red Cedar and Southern Yellow Pine utility poles. These chemicals that are harmful to the environment, and poisonous (e.g. arsenic, etc.) to humans and animals and have been shown in some instance to cause cancers. Another problem is that even with pressure treating the wood, wooden utility poles have to be replaced about every ten years. Another problem is that wooden utility poles are not aesthetically pleasing to look and are typically all a brown or black color.

It would instead be desirable to produce utility poles that do not require the above described chemical treatments. Ideally, it would be desired to provide a utility pole that does not require any of the standard chemical treatments since these chemicals listed above are all somewhat environmentally unfriendly.

There are several additional problems associated with using standard wooden utility poles. One problem is that wooden utility poles are heavy and bulky and hard to move and install.

What is instead desired is a new form of utility pole that addresses and overcomes all of these limitations, yet is still sturdy and long lasting.

SUMMARY OF THE INVENTION

The present invention provides an environmentally friendly fiberglass utility pole having added strength as compared to standard wooden poles. As will be shown, the present utility pole is made from a plurality of telescoping sections. An advantage of the present telescoping sectional design is that it is lighter and less bulky to deliver to a jobsite (compared to a standard large, single solid wooden utility pole).

The present utility pole is made from environmentally friendly materials, including but not limited to fiberglass. These environmentally friendly materials offer the advantages of being safe, aesthetically pleasing, resistant to damage and corrosion (from weather, animals, insects, etc.). The present utility pole is light weight, high strength, corrosion/rot resistant, non-conductive, electro-magnetically transparent, dimensionally stabile, low temperature capable, and aesthetically pleasing. In addition, it can be made in different colors.

In one embodiment, another advantage of the present invention is that the individual telescoping sections are made of a cross sectional shape having a repeating pattern of protruding and intruding regions around its circumference to provide added strength.

A further advantage of the present design is conservation of materials. However, the present telescoping utility pole provides a utility pole assembly having a strength comparable to that of a standard large, uniform diameter pole. Specifically, the entire length of the present utility pole need is not made to the same large diameter as would be the case when dealing with a solid wooden pole of uniform diameter. Instead, the upper and lower ends of the present invention utility pole are narrower, whereas the mid sections are somewhat larger in diameter. As will be explained, this strength advantage is due to the inner sections being reinforced by outer telescoping pole sections received thereover).

Preferably, the utility pole comprises three pole sections. However, embodiments having additional pole sections are also described. Moreover, in various embodiments, the preferred pattern of protruding and intruding regions around the circumference of the pole cross sections become progressively less pronounced moving farther outward from the center of the assembly. Embodiments with no cross sectional protruding and intruding regions are also described, and are encompassed in the present invention.

DETAILED DESCRIPTION OF THE DRAWINGS

Wooden utility poles are heavy and bulky and therefore hard to move and install. In addition, they need to be treated with chemicals that are harmful to the environment and poisonous to humans. Moreover, they are subject to wear and tear (due to weather and insects), and thus have to typically be replaced every ten years or so.

What is instead desired is an environmentally friendly solution that is long lasting, and easier to move and install. This preferred solution must also provide sufficient strength, yet without requiring excess material use. The present invention provides a solution to these problems as will be shown.

A further advantage of the present invention is that the cross sections of the telescoping utility pole sections preferably are not simply circular. Instead, the cross sectional shape of each of the pole sections provides additional bending strength beyond that that would be provided by a simple circular or annular cross sectional shape. Such additional strength may be required for standard wind loading and when components including connectors and wires are mounted onto the top of the utility pole. Secondly, the preferred illustrated cross sectional shape provides a system in which the telescoping poles can be interlocked together with no danger of rotation or movement between the pole sections.

Figure 1:
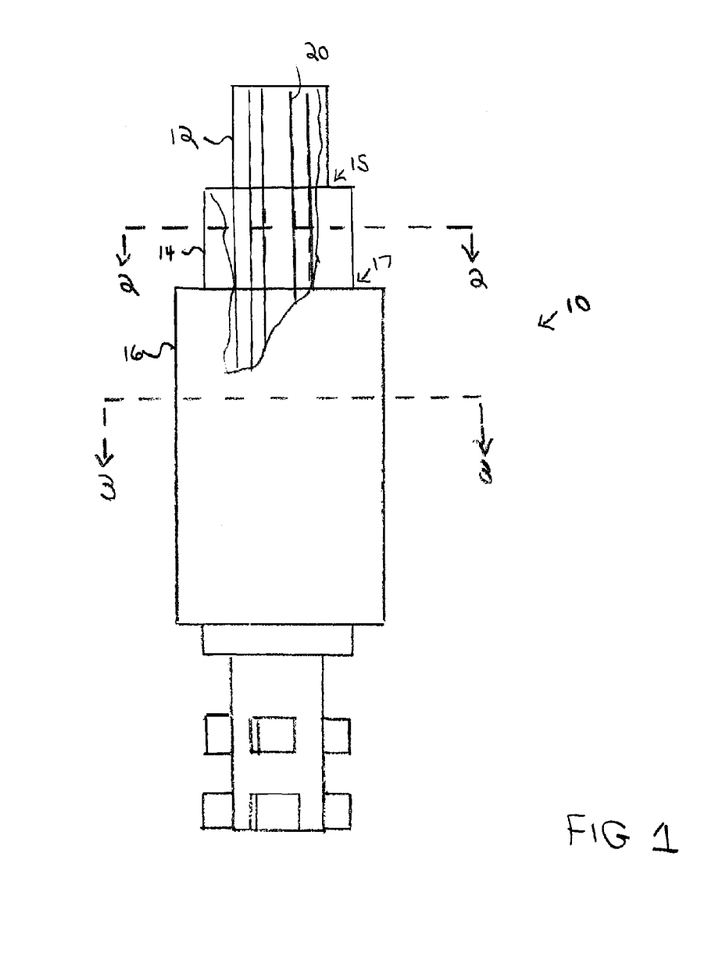
FIG. 1 is a side elevation view of a preferred embodiment of the telescoping utility pole. A partial cut out section is included to highlight the three pole sections fitting together.

FIG. 1 illustrates a preferred embodiment of the present invention. It is to be understood that the present invention can be built to various dimensions, all keeping within the scope of the invention.

In its basic form, the present invention comprises three sections, being an inner section, a center section received around the inner section and an outer section received around the center section. Preferably, the inner section is hollow, however, the present invention also covers embodiments with solid inner sections. The center section is received around the inner section. Finally, an outer section is fit around the center section.

As seen in FIG. 1, utility pole 10 comprises an inner section 12, a center section 14 and an outer section 16. It is to be understood that the present invention is not limited to any particular dimensions. The final assembled utility pole could easily have a lifetime exceeding 100 years.

Figure 2:
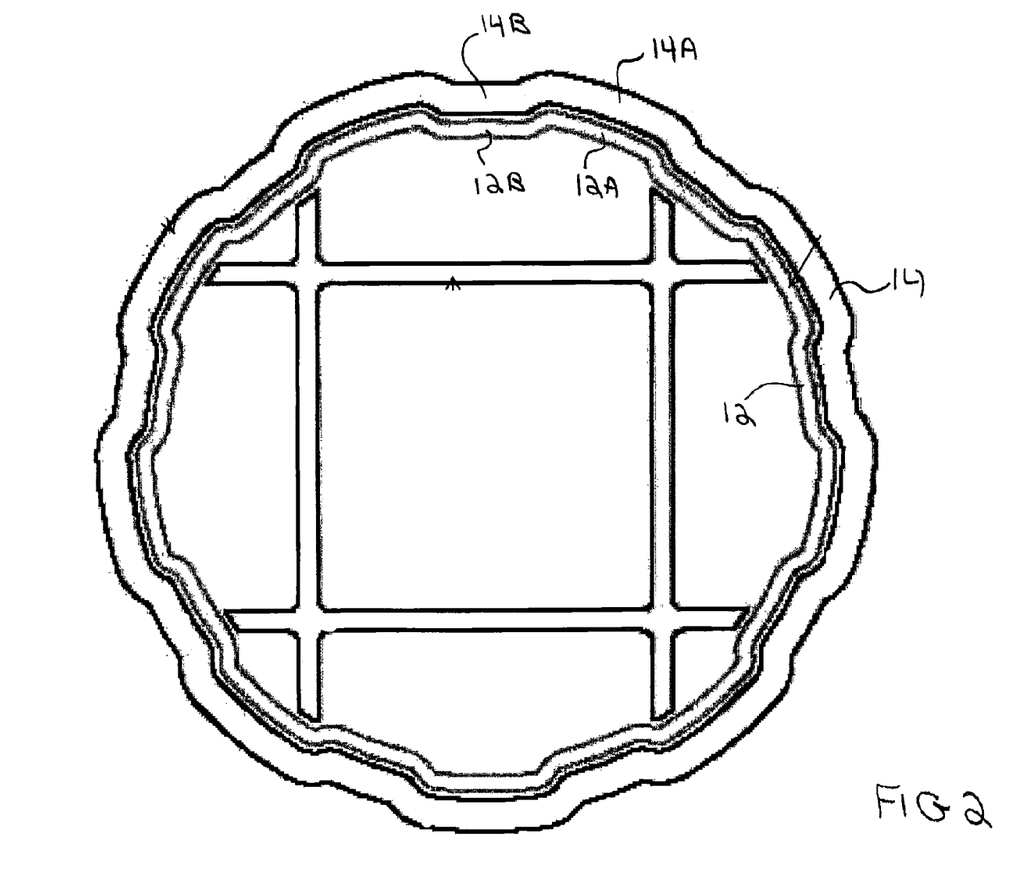
FIG. 2 is a sectional plan view taken along line 2-2 in FIG. 1.
Figure 3:
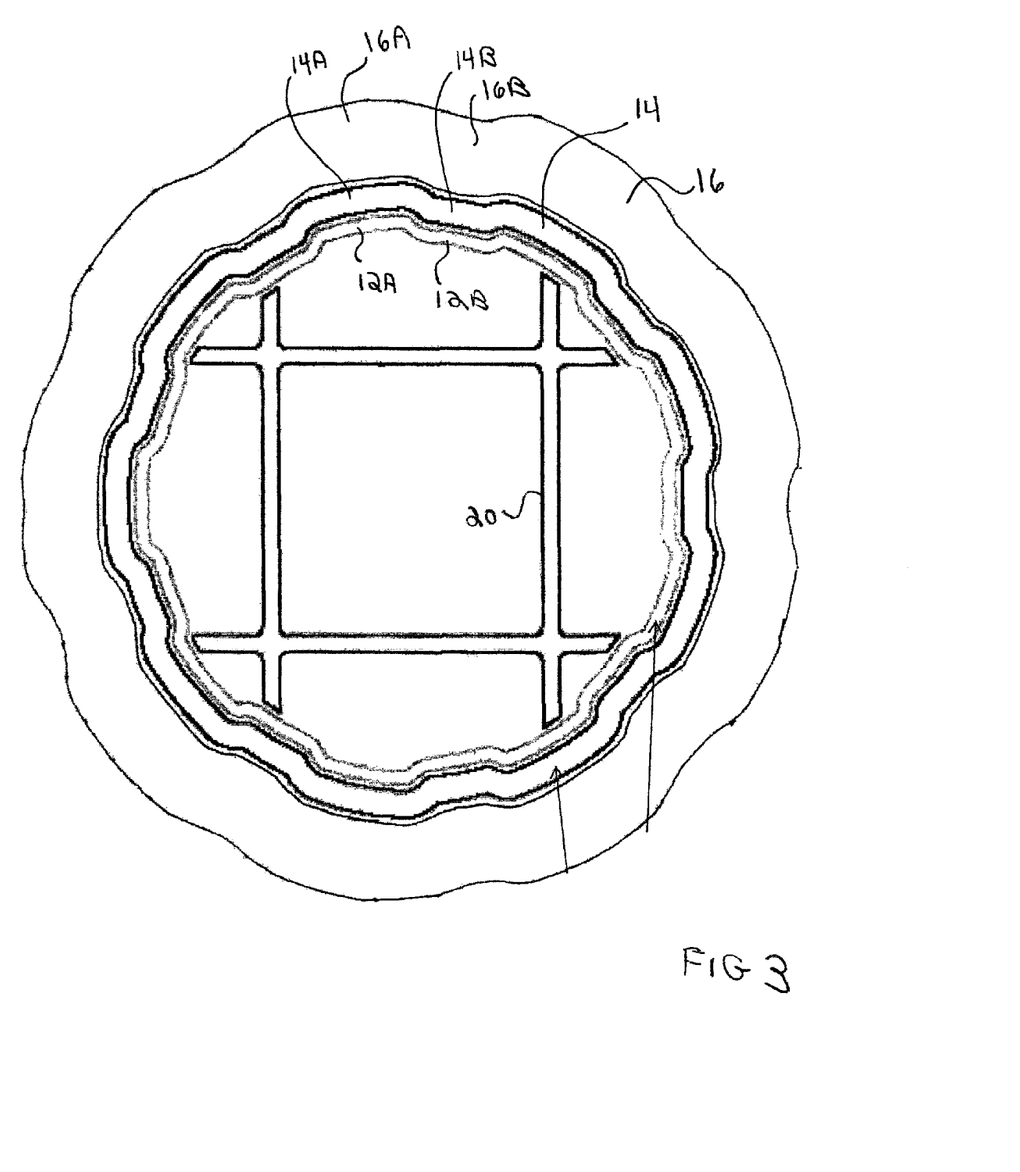
FIG. 3 is a sectional plan view taken along line 3-3 in FIG. 1.

As seen in the cross sectional views of FIGS. 2 and 3, sections 12, 14 and 16 each have protruding regions 12A, 14A and 16A (i.e.: areas that stick radially outwards), and intruding regions 12B, 14B and 16B (i.e.: areas that stick radially inwards).

Inner pole section 12 is received into center pole section 14 such that sections 12A, match up with or fit into sections 14A. Sections 12B mate, match up with or fit into sections 14B. Similarly, center pole section 14 is received into outer pole section 16 such that sections 14A mate, match up with or fit into sections 16A. Sections 14B mate, match up with or fit into sections 16B.

In the illustrated embodiments, pole sections 12, 14 and 16 are all shown as having a similarly dimensioned cross section (e.g.: a repeating pattern of protruding and intruding regions 12A/14A/16A and 12B/14B/16B, respectively around the circumference of the cross section). Other designs are also included within the scope of the present invention. For example, it is to be understood that pole section 12 need not be hollow. In addition, pole section 16 can have a more rounded outer surface. Moreover, the degree to which the protruding and intruding regions exist can be progressively less pronounced moving outwards from the center of the assembly. For example, regions 12A/12B may be more pronounced than regions 14A and 14B. Similarly, regions 14A/14B may be more pronounced than regions 16A and 16B. As a result, the exterior of the pole assembly can be smoother than the interior sections. Stated another way, the protrusions and intrusions can be become less and less pronounced the farther outward one moves away from the center of the assembly. In fact, the outer surface of the entire assembly can even be smooth. As will also be shown, one or more additional pole sections can even be added outside of pole section 16. Each additional outer pole section can be smoother than the last. What is important within the scope of the present invention is that the outer surface of pole section 12 mates with the inner surface of pole section 14 and that the outer surface of pole section 14 mates with the inner surface of pole section 16. The same is true when additional section(s) are added around section 16.

As can also be seen, inner pole section 12 is preferably longer than center pole section 14 and the center pole section 14 is preferably longer than outer pole section 16. Thus, outer section 16 surrounds the middle but not the ends of center section 14, and the center section 14 surrounds the middle but not the ends of inner section 12. This gives the overall pole assembly 10 a narrow top and a narrow bottom end. The narrow top end ensures that the pole is not top heavy. Additionally, the bottom end can be narrower (i.e.: not reinforced all the way to its bottom by pole sections 14 and 16) because the bottom end of pole assembly 10 is inserted into the ground G. (Typically, the bottom 10% plus two feet of a utility pole are inserted into the ground).

In preferred embodiments, each of the inner 12, center 14 and outer 16 pole sections are made of fiberglass. Optionally, they may be made of a suitable thermoset resin, including but not limited to polyvinyl chloride. These pole sections 12, 14 and 16 can be made by pultrusion or extrusion. "Extrusion" is a manufacturing process where a material is pushed and/or drawn through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn. The feedstock may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material. Plastic extrusion commonly uses plastic chips, which are heated and extruded in the liquid state, then cooled and solidified as it passes through the die.

In some cases (such as fiber reinforced tubes) the extrudate is pulled through a very long die, in a process called "pultrusion." As is known in the art, "pultrusion" is a manufacturing process for producing continuous lengths of materials. Pultrusion raw materials include a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelation (or hardening) of the resin is initiated by the heat from the die and a rigid, cured profile is formed that corresponds to the shape of the die.

There are also protruded laminates. Most pultruded laminates are formed using rovings aligned down the major axis of the part. Various continuous strand mats, fabrics (e.g., braided, woven and knitted), and texturized or bulked rovings are used to obtain strength in the cross axis or transverse direction.

The pultriusion process is normally continuous and highly automated. Reinforcement materials, such as roving, mat or fabrics, are positioned in a specific location using preforming shapers or guides to form a pultruson. The reinforcements are drawn through a resin bath where the material is thoroughly coated or impregnated with a liquid thermosetting resin. The resin-saturated reinforcements enter a heated metal pultrusion die. The dimensions and shape of the die define the finished part being fabricated. Inside the metal die, heat is transferred initiated by precise temperature control to the reinforcements and liquid resin. The heat energy activates the curing or polymerization of the thermoset resin changing it from a liquid to a solid. The solid laminate emerges from the pultrusion die to the exact shape of the die cavity. The laminate solidifies when cooled and it is continuously pulled through the pultrusion machine and cut to the desired length. The process is driven by a system of caterpillar or tandem pullers located between the die exit and the cut-off mechanism.

In one embodiment the pultrusion resins include bisphenol-a epichlorohydrin-based vinyl esters. In another embodiment, the resins include polyesters including isophthalic, orthophthalic, propylene-maleate, fire resistant, and high cross-link density. However, the present invention is not limited to these resins and other resins can be used to practice the invention.

In one embodiment, the pultrusions include re-enforcing fibers comprising, fiberglass fibers, composite fibers, etc. However, the present invention is not limited to these resins and other resins can be used to practice the invention.

One resin used in fiberglass pultrusions is a thermoset resin. The resin used in Polyvinyl Chloride (PVC) pultrusions are typical thermoplastic resins. In the pultrusion process, under heat and pressure, the thermoset resins and re-enforcing fibers form a new inert material that is impervious to temperature. Pultruded fiberglass physical properties do not change through the full temperature cycle up to temperatures of about 200 degrees Fahrenheit (.degree. F). In direct contrast, PVC resins typically become unstable at temperatures greater than 155.degree. F.

Pultrusions, include but are not limited to, structures comprising: (1) HIGH STRENGTH—typically stronger than structural steel on a pound-for-pound basis; (2) LIGHTWEIGHT—Pultrusions are 20-25% the weight of steel and 70% the weight of aluminum. Pultruded products are easily transported, handled and lifted into place; (3) CORROSION/ROT RESISTANT—Pultruded products will not rot and are impervious to a broad range of corrosive elements; (4) NON-CONDUCTIVE—fiberglass reinforced pultrusions have low thermal conductivity and are electrically non-conductive; (5) ELECTRO-MAGNETIC TRANSPARENT—Pultruded products are transparent to radio waves, microwaves and other electromagnetic frequencies; (6) DIMENSIONAL STABILE—The coefficient of thermal expansion of pultruded products is slightly less than steel and significantly less than aluminum; (7) LOW TEMPERATURE CAPABLE—FiberGlass fiber reinforced pultrusions exhibit excellent mechanical properties at very low temperatures, even −70.degree. F. Tensile strength and impact strengths are greater at −70.degree. F. than at +80.degree. F.; and (8) AESTHETICLY PLEASING—Pultruded profiles are pigmented throughout the thickness of the part and can be made to virtually any desired custom color. Special surfacing veils are also available to create special surface appearances such as wood grain, marble, granite, etc.

In one embodiment, pole sections 12, 14 and 16 comprise extruded plastic materials including, but not limited to, Polyvinyl Chloride (PVC), Acrylonitrile Butadiene Styrene (ABS), High Impact Polypropylene (HIP), Polypropylene, High-Density Polyethylene (HDPE), Polycarbonate, Polyethylene Terephthalate Glycol (PETG), Nylon, Fiber reinforced Polypropylene, Fiber Reinforced Plystyrene and other types of plastics. In another embodiment, the pole sections comprise composite materials. In another embodiment, the pole sections comprise recycled plastic materials. Preferably, the pole sections can be made in different colors (e.g., red, green, yellow, blue, brown, etc.) to be aesthetically pleasing. Such plural different colors may blend in with a natural environmental setting or a pre-determined design scheme. For example, a new subdivision may include only blue extruded utility poles, while a boat dock may include only high visibility orange poles. However, the present invention is not limited to these colors and other colors can be used to practice the invention.

In preferred embodiments, an inner pole section 12 is hollow, an optional unibeam section 20 is received down into at least a portion of inner pole section 12. Unibeam 20 may be used to give additional strength to pole assembly 20. In addition, since it is composed of vertical internal channels, various wires and electrical components can be passed up and down through the center of the pole through unibeam 20. (Alternatively, the wires can be formed directly into the body of the pole sections themselves. In various embodiments, unibeam 20 is short and is only included at the top end of the pole assembly. However, the present invention covers embodiments in which unibeam 20 extends part or all of the way down thorough the interior of pole section 12.

Communications wires (e.g., fiber optic, copper, coaxial cable, etc.) or antenna wires can be run through the hollow core of pole section 12 or unibeam 20 to connect to other communications wires buried underground in dirt or subterrain pipes or tunnels. This avoids connecting unsightly communications wires between two or more extruded structure 12 and protects the communications wires or antenna wires from damage by the weather and animals When the telescoping pole sections are fit together as seen in FIG. 1, the top end of center pole section 14 can be is caulked direction onto the outside of inner pole section 12 at location 15. Similarly, the top end of outer section 16 can be is caulked directly onto the outside of center pole section 14 at location 17. This keeps rain from penetrating between the pole sections. (Note: the bottom contact points need not be caulked since not caulking would leave small passageways for drainage).

Figure 4:
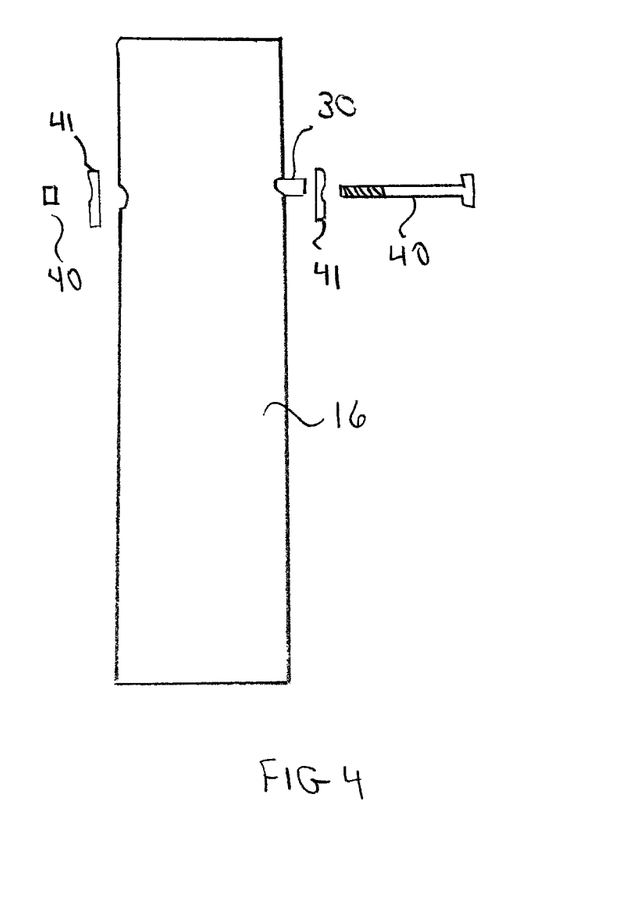
FIG. 4 is a side elevation view of the system used to fasten the three pole sections together.
Figure 5:
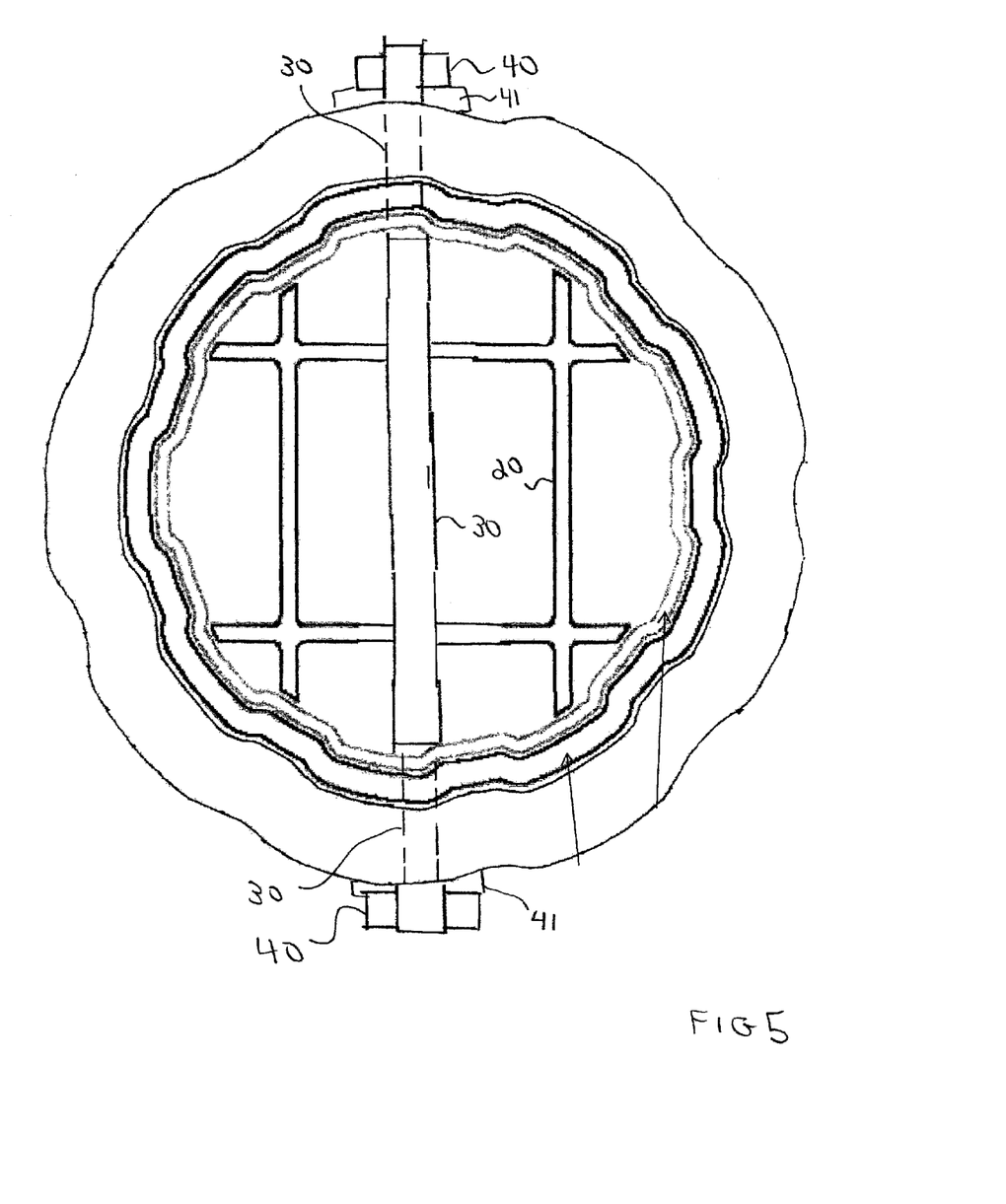
FIG. 5 is a sectional plan view of the fastening system of FIG. 4, showing the fastener system holding the telescoping pole sections together.

FIGS. 4 and 5 illustrate systems for fastening poles together. Specifically, an interior tube 30 passes through the structure. Then, a nut and bolt assembly 40 passes through tube 20. Bushings 41 are also included. The advantage of tube 30 is that it prevents over tightening from distorting the outer shape of the pole assembly. Bushings 41 also distribute the tightening load from nut and bolt 40 around a portion of the outside of outer pole section 16.

FIG. 5 illustrates the embodiment of FIG. 3, but with tubing 30 and nut and bolt assembly 40 holding the various pole sections 12, 14 and 16 together. As can be seen, tube 30 and nut and bolt assembly 40 also pass through unibeam section 20. It is to be understood that tube 30, nut and bolt assembly 40 and bushings 41 can be used at various locations along the vertical length of pole assembly 10 (thereby just holding sections 12 and 14 together, or holding sections 12, 14 and 16 together), as desired.

The novel cross sectional shape of pole sections 12, 14 and 16 gives excellent resistance to wind shear forces. In optional embodiments, additional filaments or webbing (including fiberglass, plastic, ester, polyester, nylon, and composite materials) may be added internally or externally to add strength.

Figure 6:
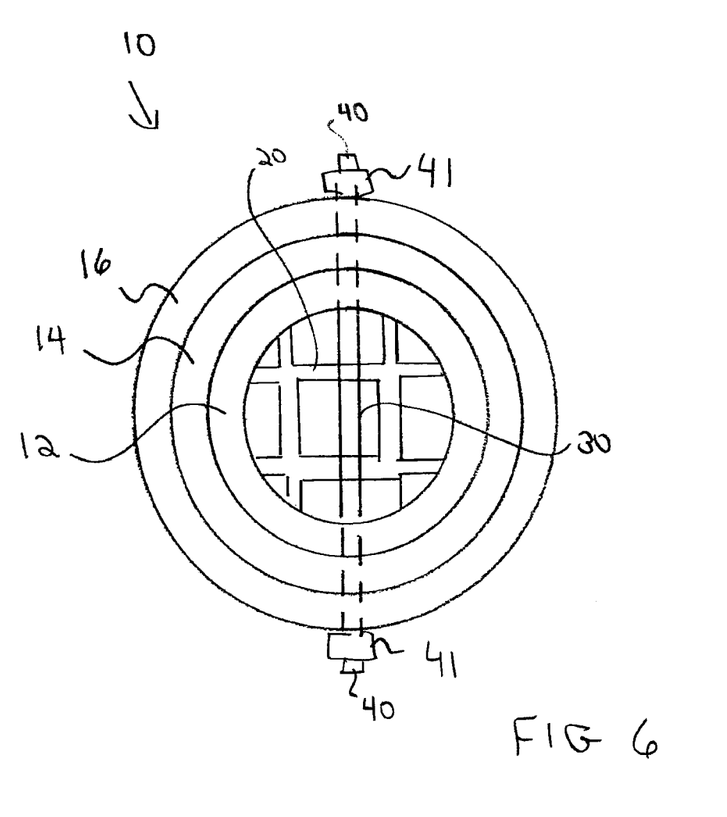
FIG. 6 is an embodiment similar to FIG. 3, but wherein the pole sections do not have protruding and intruding regions, but are instead circular.

FIG. 6 covers the embodiment of the invention in which the pole sections do not have protruding and intruding regions, but are instead circular. It is to be understood that the present invention encompasses pole sections having any particular cross section.

Figure 7:
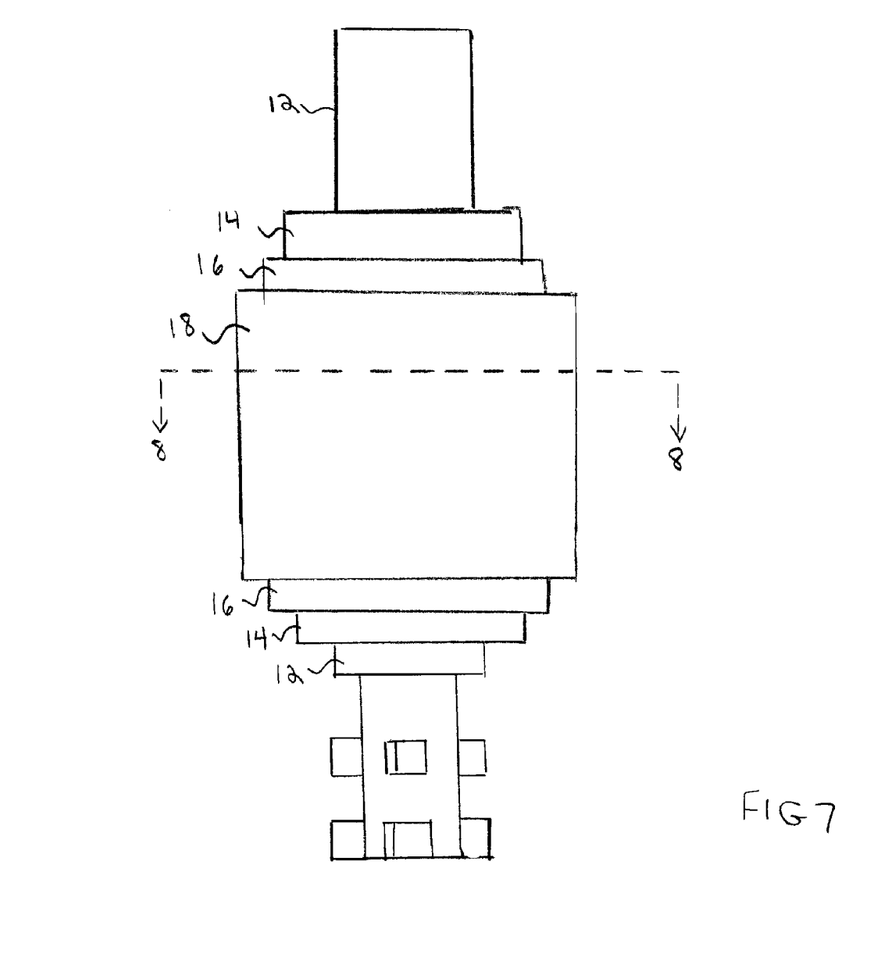
FIG. 7 is a view similar to FIG. 1, but showing a telescoping utility pole having four pole sections.
Figure 8:
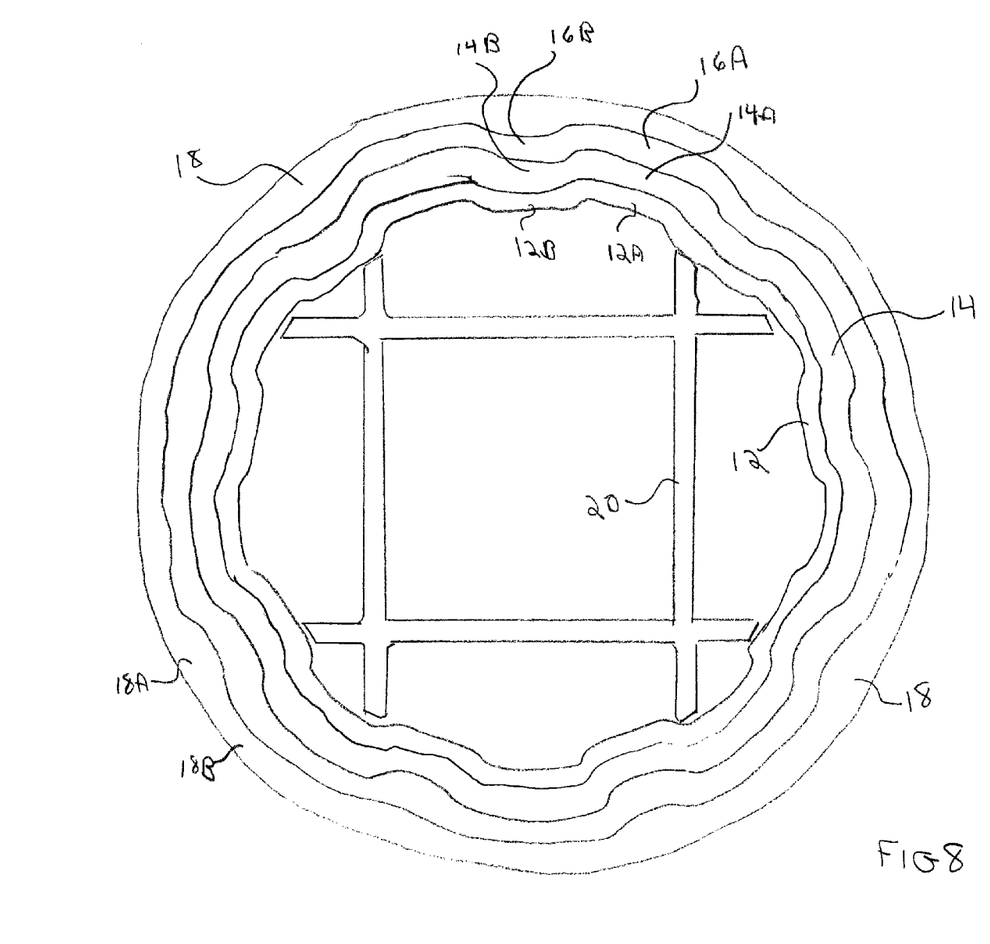
FIG. 8 is a sectional plan view taken along line 8-8 in FIG. 7.

FIGS. 7 and 8 show an embodiment of the invention in which a fourth pole section 18 is included. Pole section 18 is received around pole section 16. It is to be understood that the present invention covers embodiments having more than three pole sections (i.e.: with one or more additional sections 18, etc. being added around section 16). The present invention is therefore understood to include embodiments having two, three, four or more pole section received around one another.

As can also be seen in FIG. 8, the preferred pattern of protruding and intruding regions around the circumference of the pole cross sections can become progressively less pronounced moving farther outward from the center of the assembly. Specifically, regions 12A/12B are more pronounced than regions 14A/14B. Regions 14A/14B are in turn more pronounced than regions 16A/16B. Finally, the protruding and intruding regions 18A/18B are hardly seen at all. In fact, the exterior surface of pole section 18 may be completely smooth.

What is claimed is:

1. A utility pole, comprising:
   an inner pole section having an outer surface with both protruding and intruding regions,
   a hollow center pole section received around the inner pole section, wherein the center pole section has both protruding and intruding regions on both its inner and outer surfaces; and
   a hollow outer pole section received around the hollow center pole section, wherein the outer pole section has both protruding and intruding regions on its inner surface,
   wherein the protruding and intruding regions on the exterior of the inner pole section mate with the protruding and intruding regions on the interior of the center pole section, and wherein the protruding and intruding regions on the exterior of the center pole section mate with the protruding and intruding regions on the interior of the outer pole section, and wherein the wall thickness of the successive pole sections ac-e is progressively thicker moving outwards from the center pole section of the utility pole, and
   wherein the protruding and intruding regions become progressively less pronounced moving farther outwards from the center of the utility pole such that the successive pole sections are progressively smoother moving outwards from the center pole section of the utility pole.

2. The utility pole of claim 1, wherein the inner pole section is longer than the center pole section and wherein the center pole section is longer than the outer pole section.

3. The utility pole of claim 2, wherein the outer section surrounds the middle of the center section but not the ends of the center section, and wherein the center section surrounds the middle of the inner section but not the ends of the inner section.

4. The utility pole of claim 1, wherein the inner, center and outer pole sections are made of fiberglass.

5. The utility pole of claim 4, wherein the sections are pultruded.

6. The utility pole of claim 1, wherein the pole sections are made of thermoset resins, including but not limited to polyvinyl chloride.

7. The utility pole of claim 1, wherein the inner, center and outer pole sections are held together by a structure passing therethrough.

8. The utility pole of claim 7, wherein the structure passing therethrough is tubing with a bolt passing therethrough.

9. The utility pole of claim 8, wherein the tubing passes through the inner and center pole sections to secure the inner and center pole sections together.

10. The utility pole of claim 9, wherein the tubing also passes through the outer pole section to secure the inner, center and outer pole sections together.

11. The utility pole of claim 1, wherein the inner pole section is hollow, further comprising:
   a unibeam section received into at least a portion of the inner pole section.

12. The utility pole of claim 1, wherein the top end of the center pole section is caulked to the inner pole section and wherein the top end of the pouter pole section is caulked to the center pole section.

13. The utility pole of claim 1, further comprising:
   a second hollow outer pole section received around the first hollow outer pole section.

14. The utility pole of claim 13, wherein the second hollow outer pole section has both protruding and intruding regions on its inner surface, and
   wherein: the protruding and intruding regions on the inner pole section are more pronounced than the protruding and intruding regions on the center pole section, the protruding and intruding regions on the center pole section are more pronounced than the protruding and intruding regions on the first outer pole section, and the protruding and intruding regions on the first outer pole section are more pronounced than the protruding and intruding regions on the second outer pole section.

15. A utility pole, comprising:
   an inner pole section,
   a hollow center pole section received around the inner pole section; and
   a hollow outer pole section received around the hollow center pole section,
   wherein the exterior of the inner pole section mates with the interior of the center pole section, and wherein the exterior of the center pole section mates with the interior of the outer pole section, and
   wherein the wall thickness of the successive pole sections is progressively thicker moving outwards from the center pole section of the utility pole, and
   wherein the protruding and intruding regions become progressively less pronounced moving farther outwards from the center of the utility pole such that the successive pole sections are progressively smoother moving outwards from the center pole section of the utility pole.

16. The utility pole of claim 15, wherein the inner pole section is longer than the center pole section and wherein the center pole section is longer than the outer pole section.

17. The utility pole of claim 15, wherein the inner, center and outer pole sections are made of fiberglass.

18. The utility pole of claim 17, wherein the sections are pultruded.

19. The utility pole of claim 15, wherein the inner, center and outer pole sections are held together by tubing therethrough with a bolt passing through the tubing.

20. The utility pole of claim 15, wherein the inner pole section is hollow, further comprising:

a unibeam section received into at least a portion of the inner pole section.

21. The utility pole of claim 15, wherein,
the inner pole section has an outer surface with both protruding and intruding regions,
the center pole section has both protruding and intruding regions on both its inner and outer surfaces; and
the outer pole section has both protruding and intruding regions on its inner surface.

22. The utility pole of claim 15, further comprising:
a second hollow outer pole section received around the first hollow outer pole section.

23. The utility pole of claim 22, wherein the protruding and intruding regions on the inner pole section are more pronounced than the protruding and intruding regions on the center pole section, and wherein the protruding and intruding regions on the center pole section are more pronounced than the protruding and intruding regions on the outer pole section.

\* \* \* \* \*